(12) United States Patent
Niemitalo et al.

(10) Patent No.: US 6,169,388 B1
(45) Date of Patent: Jan. 2, 2001

(54) CHARGING METHOD AND DEVICE

(75) Inventors: Paavo Niemitalo, Kello; Sakari Siponen, Oulu, both of (FI)

(73) Assignee: Nokia Mobile Phones Limited, Espoo (FI)

( * ) Notice: Under 35 U.S.C. 154(b), the term of this patent shall be extended for 0 days.

This patent is subject to a terminal disclaimer.

(21) Appl. No.: 09/481,962

(22) Filed: Jan. 12, 2000

Related U.S. Application Data

(63) Continuation of application No. 09/330,479, filed on Jun. 11, 1999.

(51) Int. Cl.[7] .................................................. H02J 7/04
(52) U.S. Cl. ........................................ 320/139; 320/162
(58) Field of Search ..................................... 320/125, 127, 320/128, 137, 139, 152, 157, 162

(56) References Cited

U.S. PATENT DOCUMENTS

| | | | |
|---|---|---|---|
| 5,446,364 | 8/1995 | Naskali | 320/114 |
| 5,625,274 | 4/1997 | Naskali | 320/149 |
| 5,648,711 | 7/1997 | Hakkarainen | 320/107 |
| 5,760,568 | 6/1998 | Naskali | 320/139 |
| 5,821,735 | 10/1998 | Scharff | 320/125 |

*Primary Examiner*—Shawn Riley
*Assistant Examiner*—Pia Tibbits
(74) *Attorney, Agent, or Firm*—Perman & Green, LLP

(57) ABSTRACT

A start up charger and a method of providing an initial charge for a significantly depleted battery of a cellular phone is described in which the charging switch is cycled to provide a pulsed charge to the battery until said battery is charged to the operational voltage threshold of the cellular telephone controller.

7 Claims, 5 Drawing Sheets

CHARGING METHOD AND DEVICE

This application is a continuation of Ser. No. 09/330,479 filed Jun. 11, 1999.

BACKGROUND OF THE INVENTION

With the proliferation of cellular phones, there has been pressure to improve the battery power capability to supply these devices. The efficacy of these phones relies on mobility and such mobility requires efficient battery power. From the start the batteries used have been rechargeable, prompting significant development in the structure of rechargeable batteries. Under normal conditions, the charging of such batteries is accomplished by circuitry built into the control microprocessor of the cellular phone. In order to operate, however, the controller requires a minimum voltage level from the batteries. A problem therefore arises when the battery charge is depleted below these minimum levels.

It is a purpose of this invention to provide an improved charging system for depleted batteries.

One of the prior art solutions to this charging problem is shown schematically in FIG. 1. In this instance, a start up module is added to the controller circuit to provide a limited initial constant current charge at a low current for example from 100 ma to 180 ma. This charging current is allowed to build the battery voltage to a level which will support the operation of the main controller. The controller will then take over, switching off the start-up charging module and allowing the battery to charge in a more rapid conventional manner.

In the start up mode at which the controller 2 is disabled, the start up current must be limited in order avoid excessive power loss. The power loss is caused by the need to dissipate the voltage drop from the charger voltage to the battery voltage. In view of the limited charge current, the start up mode requires an unacceptably long period of time to reach the operative voltage of the controller 2.

It is a purpose of this invention to provide a quicker start up charging mechanism which operates with lower power consumption.

SUMMARY OF THE INVENTION

In this invention, the start up charging circuitry is replaced by a new and unique low power start up module. The start up module of this invention consists of a pulse generator which is used to cycle the conventional charging circuit. In the start up mode, the controller charging circuit is disabled because of insufficient voltage from the battery. In this invention the charging switch is controlled by the start up module when the battery power is below the threshold of the controller. The start up module generates a pulse chain which cycles the charging switch and thereby turns the standard charging circuit on and off. In this manner a relatively rapid and efficient initial charging of a dead or substantially depleted battery is obtained. A comparator senses the battery voltage, enables the controller charging cycle, and disables the start up charging cycle when the operational threshold voltage for the controller is obtained.

DESCRIPTION OF THE DRAWING

The invention is described in more detail below with reference to the attached drawing in which.

DESCRIPTION OF THE PREFERRED EMBODIMENT

Figure 1:
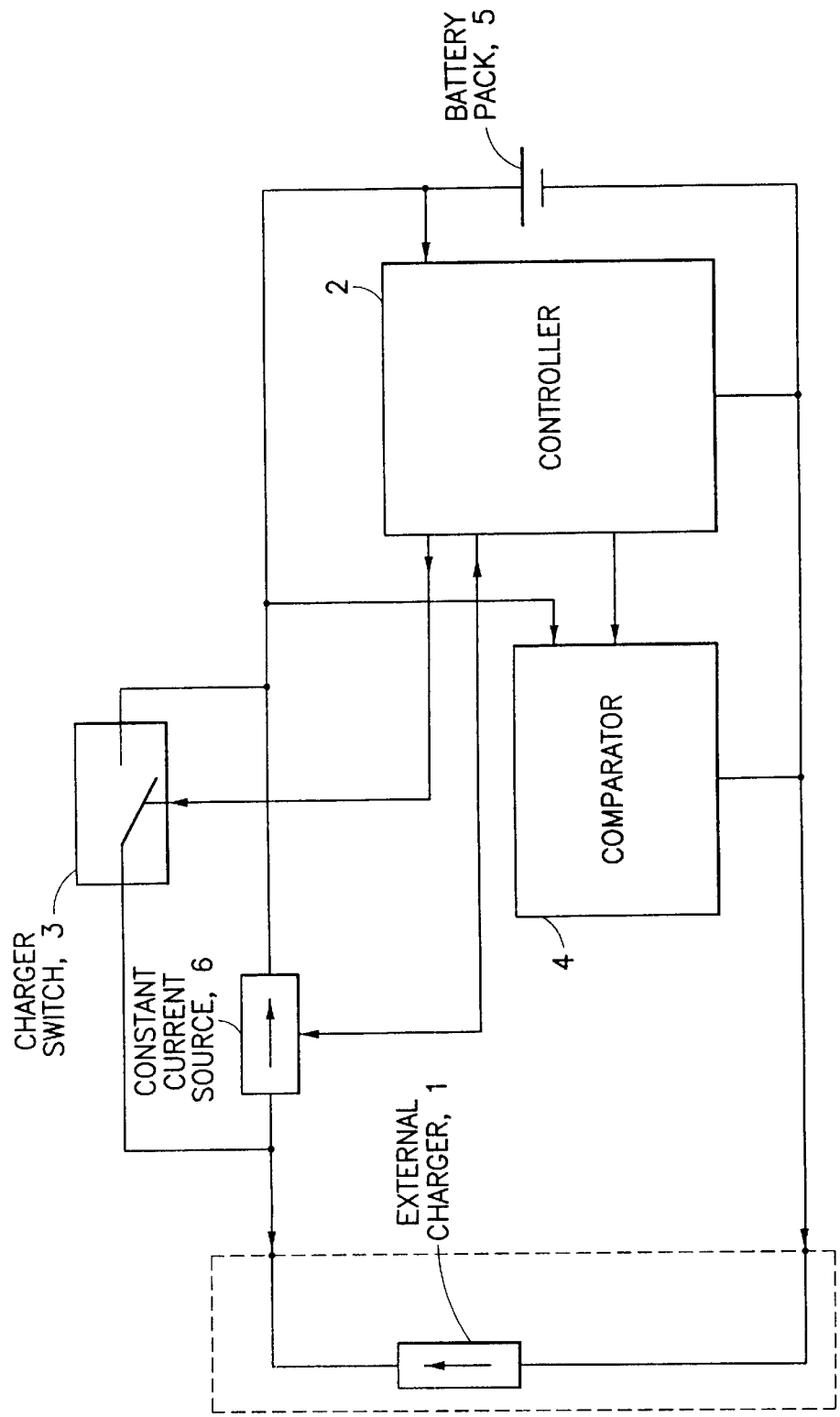
FIG. 1 is a schematic diagram of a prior art start up charging circuit.

As shown in FIG. 1, the prior art charging system consists of external charger 1, controller 2 and charging switch 3. A comparator 4, forming part of the intelligent circuitry of controller 2, senses the condition of battery pack 5 and provides controller 2 with the data required to operate charging switch 3 and a start up charger 6.

Start up charging module 6 consists of a constant current source connected to the battery pack 5 and enabled by controller 2.

Controller 2 is a microprocessor containing the required hardware and software to manage the operation of a cellular phone in a standard manner. Charger switch 3 is operated by controller 2 in response to the voltage level supplied by battery pack 5 and monitored by comparator 4. Since the controller 2 requires a certain threshold voltage in order to operate, the charging switch 3 is therefore disabled when battery pack voltage levels are below the threshold. When the supply voltage falls below the threshold, the constant current source is enabled by controller 2 and charging switch 3, and the comparator 4 is disabled by the signal from the controller 2. Below the threshold voltage, external charger 1 is not loaded with a sufficiently high current and it will remain in the voltage limited or idle mode.

In the prior art system shown in FIG. 1, start up module 6 initially applies a limited charging current to the battery pack 5. The start up module 6 continues its function until the comparator 4 or controller 2 senses that the output of battery pack 5 has reached the threshold level. It has been found that low level charging currents of 100 ma to 180 ma are effective, but require unacceptable periods of time to charge the battery pack to threshold levels. In addition significant power is used which tends to generate undesirable heat within the current generator of module 6.

Figure 2:
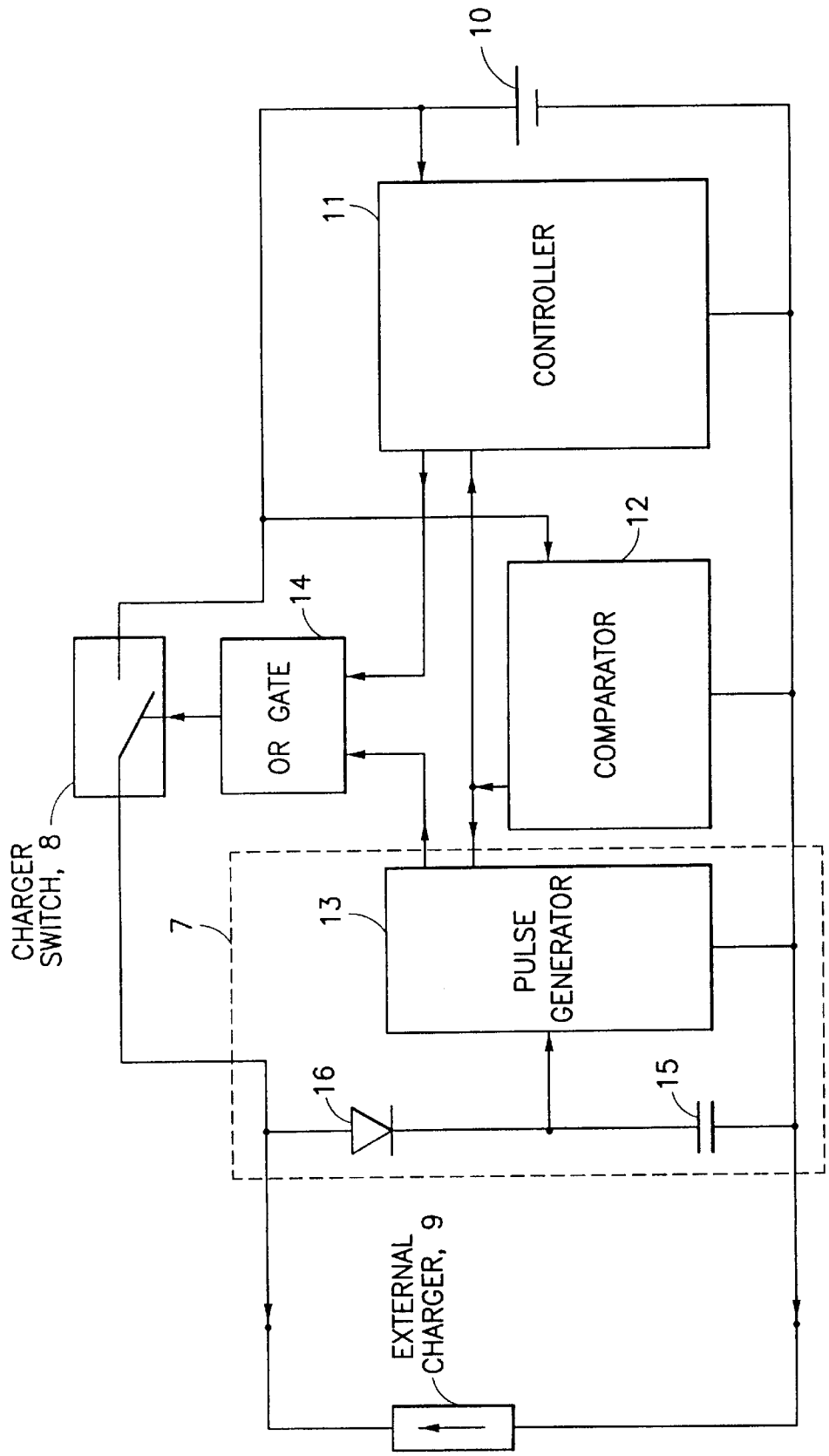
FIG. 2 is a schematic diagram of the start up circuit of this invention.
Figure 3:
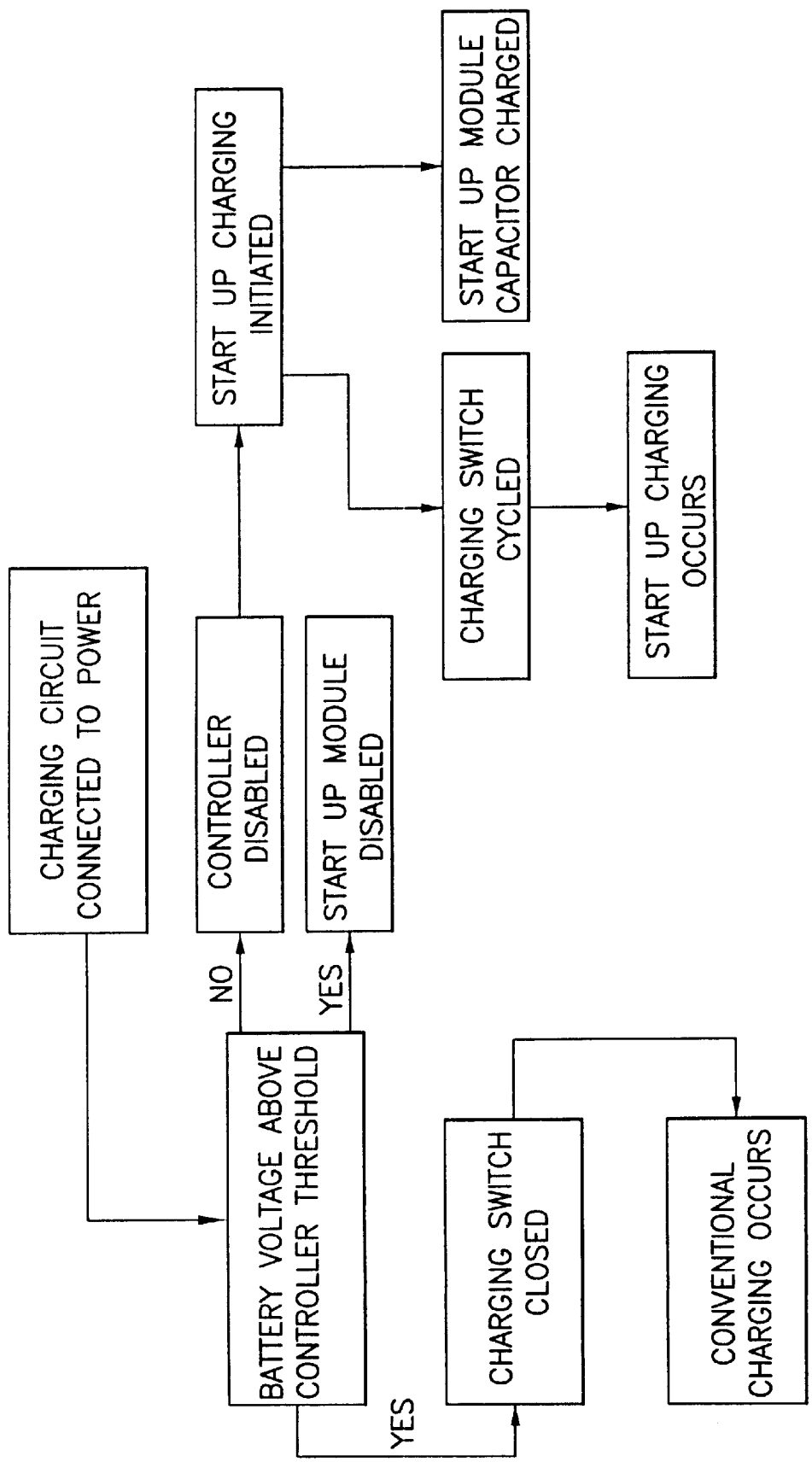
FIG. 3 is a chart of the operating steps of this invention.

According to the system of this invention, in order to accelerate the charging time and to reduce the power loss in the appliance, a start up module 7 is designed as shown in FIG. 2. Start up module 7 is constructed to generate a pulsating signal suitable for cycling charger switch 8 off and on to restore the voltage of battery pack 10 to a desirable level.

Charger switch 8 controls a charger 9 to recharge the battery back 10 in a conventional manner, when connected to an external power supply (not shown). Under normal conditions, controller 11 functions to enable the switch 8 when the voltage of battery 9 is depleted to an undesirable level above the operative threshold of controller 11. The closing of switch 8 initiates the conventional charging cycle. As was discussed above, a certain threshold battery voltage is required before the controller 11 will function in any manner. The unique start up module 7 of this invention operates to charge the battery pack 10 to the threshold level of controller A comparator 12 senses battery voltage and compares it to the predetermined threshold voltage needed to operate controller 11. The controller 11 is disabled when the battery voltage falls below the threshold level.

The startup charging module 7 consists of a pulse generating circuit 13 which drives an OR gate 14 to cycle the charging switch 8 on and off and thereby apply a pulsed charging current to the battery pack 10 from the charger 9. In order to power the pulse generating circuit 13 during the process, a capacitor 15 is connected across the charger 9 through a diode 16. When the charger switch 8 is off, the capacitor 15 is charged by the idle voltage of charger 9. This provides the operational voltage for the pulse generator 13. The duty cycle of the pulse generator 13 may be rapid, but it has been found that an off period, sufficient for the capacitor 15 to reach a voltage equivalent of the idle state voltage of the charger 9, is desirable. Capacitor 15 is selected accordingly. The characteristics of the pulsed signal to the switch 8 will be in part determined by the components selected and the type of cell phone used.

In operation, the cellular phone is connected to the charger 9 when charging is warranted. If the comparator 12 senses a battery voltage that is at or above the threshold level for controller 11 to operate, then the charging switch 8 is enabled by the controller 11 according to a stored charging algorithm. The charging operation then occurs in a conventional manner. When the comparator 12 senses that the voltage output of the battery pack 10 has been depleted below the operational threshold of the controller 11, then the pulse generator 13 will be enabled. The pulsed signal will cycle the charging switch 8 off and on thereby applying a pulsed charging current to the battery, as shown in FIG. 4*a*.

In this manner the start up charge is obtained up to the threshold value in less time and while wasting less energy than the prior system. Once the threshold voltage is reached, the comparator 12 disables the pulse generator 13 and enables the controller 11 which assumes control of the remaining charging requirement.

Figure 4A:
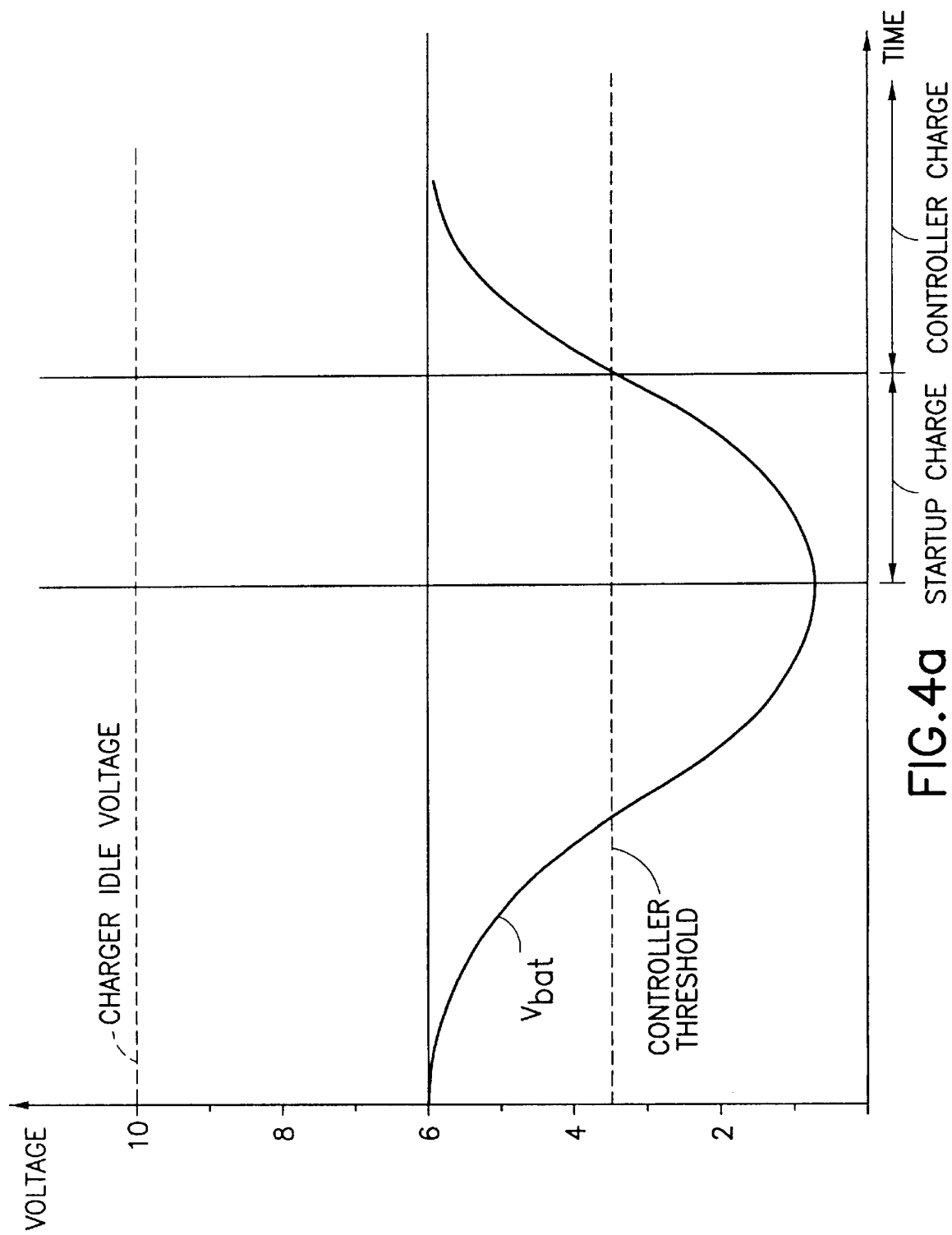
FIG. 4a is a graph of battery voltage over an operating cycle.
Figure 4B:
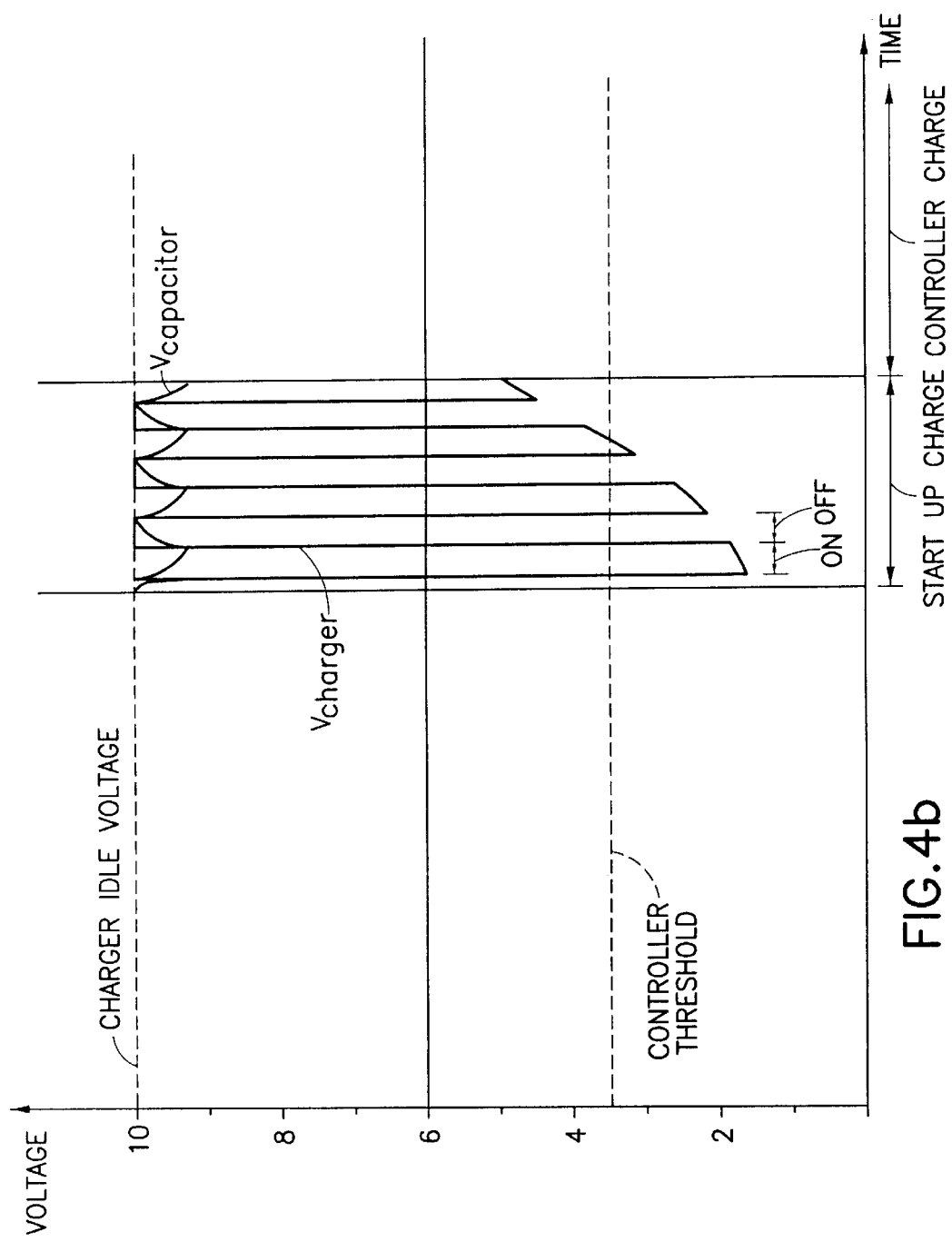
FIG. 4b is a graph of start up capacitor voltage over an operating cycle.

An example of a charging cycle using the start up charger of this invention is shown in the graph of FIG. 4*a*. The voltages indicated are relative to a 6 volt system and for illustration only as they will vary considerably depending on the specifications for the cellular phone and the associated battery pack. A typical voltage profile for the start up capacitor 14 is shown in FIG. 4*b* related to the pulsed actuation of charger 9 shown in FIG. 4*a*.

The embodiment described above may be varied to accomplish the desired result without deviating from the invention as described in the claims below.

We claim:

1. A battery charging system for a communication device, said device having a controller constructed to operate the battery charging system when enabled, said controller having a predetermined minimum operating voltage threshold, said charging system comprising:

a charger for connection to the communication device to provide a charging current to the battery when the battery is depleted;

a charger switch connected to the charger and to the controller to actuate the charger in response to a signal from the controller when the voltage of the battery falls to an undesirable level;

a comparator connected to sense battery voltage and compare said voltage to said voltage threshold and to enable said controller when said battery voltage is equal to or in excess of said voltage threshold; and a start up charger module comprising a pulse generator connected to the charger switch to cycle said switch on and off when said start up charger is enabled, said start up charger connected to said comparator and enabled thereby when said battery voltage is depleted below said threshold value.

2. A battery charging system for a communication device, said device having a controller constructed to operate the battery charging system when enabled, said controller having a predetermined minimum operating voltage threshold, said charging system as described in claim 1 wherein the pulse generator is powered by the idle voltage output of the charger.

3. A battery charging system for a communication device, said device having a controller constructed to operate the battery charging system when enabled, said controller having a predetermined minimum operating voltage threshold, said charging system as described in claim 2 further comprising a capacitor connected to the charger to receive said idle voltage output and wherein said pulse generator is powered by the output of said capacitor.

4. A battery charging system for a communication device, said device having a controller constructed to operate the battery charging system when enabled, said controller having a predetermined minimum operating voltage threshold, said charging system as described in claim 1 wherein said comparator disables said start up charger when the battery voltage reaches said voltage threshold.

5. In a battery charging system for a communication device having a charger, a charging switch for actuating said charger, and a controller, a method for replenishing the voltage level of the battery comprising the steps of:

connecting the communication device to the charger;

sensing the voltage level of the battery and comparing said voltage to a predetermined minimum voltage threshold;

enabling the controller when said battery voltage level is at least equal to said voltage threshold, wherein said controller actuates said charger switch to allow the charger to replenish the battery;

disabling the controller when said battery voltage is below said voltage threshold;

generating a pulsed signal for connection to the charging switch to cycle said switch on and off in response thereto when said battery voltage is below said voltage threshold, said cycling of said switch operating to charge the battery to at least said voltage threshold; and disabling said pulsed signal when said battery voltage reaches said voltage threshold.

6. In a battery charging system for a communication device having a charger, a charging switch for actuating said charger, and a controller, a method for replenishing the voltage level of the battery as described in claim 5 further comprising the step of powering the generation of the pulsed signal by connection to the output of the charger.

7. In a battery charging system for a communication device having a charger, a charging switch for actuating said charger, and a controller, a method for replenishing the voltage level of the battery as described in claim 6 wherein the step of powering the pulsed signal comprises charging a capacitor by connection to the output of the charger and using the discharge of said capacitor to power said pulse generation.

\* \* \* \* \*